United States Patent
Fung et al.

(10) Patent No.: US 10,089,543 B2
(45) Date of Patent: Oct. 2, 2018

(54) SYSTEM AND METHOD FOR DETECTING DISTRACTION AND A DOWNWARD VERTICAL HEAD POSE IN A VEHICLE

(71) Applicant: Honda Motor Co., Ltd., Tokyo (JP)

(72) Inventors: Kin C. Fung, Dublin, OH (US); Peter Chpak, Raymond, OH (US); Timothy J. Dick, Dublin, OH (US); Dhanashree Palande, Dublin, OH (US)

(73) Assignee: Honda Motor Co., Ltd., Tokyo (JP)

(*) Notice: Subject to any disclaimer, the term of this patent is extended or adjusted under 35 U.S.C. 154(b) by 48 days.

(21) Appl. No.: 15/224,267

(22) Filed: Jul. 29, 2016

(65) Prior Publication Data

US 2018/0032825 A1   Feb. 1, 2018

(51) Int. Cl.
| | |
|---|---|
| G06K 9/00 | (2006.01) |
| G06K 9/62 | (2006.01) |
| G06K 9/66 | (2006.01) |
| G06T 7/00 | (2017.01) |
| G06T 7/73 | (2017.01) |

(52) U.S. Cl.
CPC ....... G06K 9/00845 (2013.01); G06K 9/0061 (2013.01); G06K 9/00268 (2013.01); G06K 9/00302 (2013.01); G06K 9/00335 (2013.01); G06K 9/6215 (2013.01); G06K 9/66 (2013.01); G06T 7/0042 (2013.01); G06T 7/73 (2017.01); *G06T 2207/30201* (2013.01); *G06T 2207/30268* (2013.01)

(58) Field of Classification Search
None
See application file for complete search history.

(56) References Cited

U.S. PATENT DOCUMENTS

| | | |
|---|---|---|
| 6,724,920 B1 | 4/2004 | Berenz et al. |
| 7,570,785 B2 | 8/2009 | Breed |
| 8,406,479 B2 | 3/2013 | Tsukizawa |
| 9,129,505 B2 | 9/2015 | Breed et al. |

(Continued)

FOREIGN PATENT DOCUMENTS

| | | |
|---|---|---|
| CN | 104013414 | 9/2014 |
| WO | WO 2015/015173 | 2/2015 |

OTHER PUBLICATIONS

Fu, Xianping, et al. "Automatic calibration method for driver's head orientation in natural driving environment." IEEE Transactions on Intelligent Transportation Systems 14.1 (2013): 303-312.*

(Continued)

*Primary Examiner* — Vu Le
*Assistant Examiner* — Tracy Mangialaschi
(74) *Attorney, Agent, or Firm* — Rankin, Hill & Clark LLP

(57) ABSTRACT

A computer-implemented method for detecting a head pose in a vehicle including receiving images of a vehicle occupant located in the vehicle from an imaging device and selecting facial feature points from a plurality of facial feature points extracted from the images. The method includes calculating a head pose point based on normalizing the selected facial feature points, determining the head pose based on a change in position of the head pose point over a period of time T, and controlling one or more vehicle systems of the vehicle based on the head pose.

24 Claims, 9 Drawing Sheets

(56) References Cited

U.S. PATENT DOCUMENTS

| | | | |
|---|---|---|---|
| 2007/0159344 A1* | 7/2007 | Kisacanin | G06K 9/00362 340/576 |
| 2008/0130961 A1* | 6/2008 | Kinoshita | G06K 9/00281 382/118 |
| 2013/0162632 A1 | 6/2013 | Varga et al. | |

OTHER PUBLICATIONS

Zhao ZQ, Cheng K, Peng Q, Wu X. A Real-Time Head Pose Estimation Using Adaptive POSIT Based on Modified Supervised Descent Method. In International Conference on Intelligent Computing Jul. 12, 2016 (pp. 74-85). Springer International Publishing.*

Vicente, Francisco, et al. "Driver gaze tracking and eyes off the road detection system." IEEE Transactions on Intelligent Transportation Systems 16.4 (2015): 2014-2027.*

Lee, Sung Joo, et al. "Real-time gaze estimator based on driver's head orientation for forward collision warning system." IEEE Transactions on Intelligent Transportation Systems 12.1 (2011): 254-267.*

Xie, Jian-Feng, Mei Xie, and Wei Zhu. "Driver fatigue detection based on head gesture and PERCLOS." Wavelet Active Media Technology and Information Processing (ICWAMTIP), 2012 International Conference on. IEEE, 2012.*

Rezaei et al., "Look at the Driver, Look at the Road: No Distraction! No Accident!", The University of Auckland, Private Bag 92019, Auckland, New Zealand, 8 pages, 2014.

Bar, "Driver Head Pose and Gaze Estimation Based on Multi-Template ICP 3-D Point Cloud Alignment", 2012 15th International IEEE Conference on Intelligent Transportation Systems, Anchorage, Alaska, USA, Sep. 16-19, 2012, 6 pages.

* cited by examiner

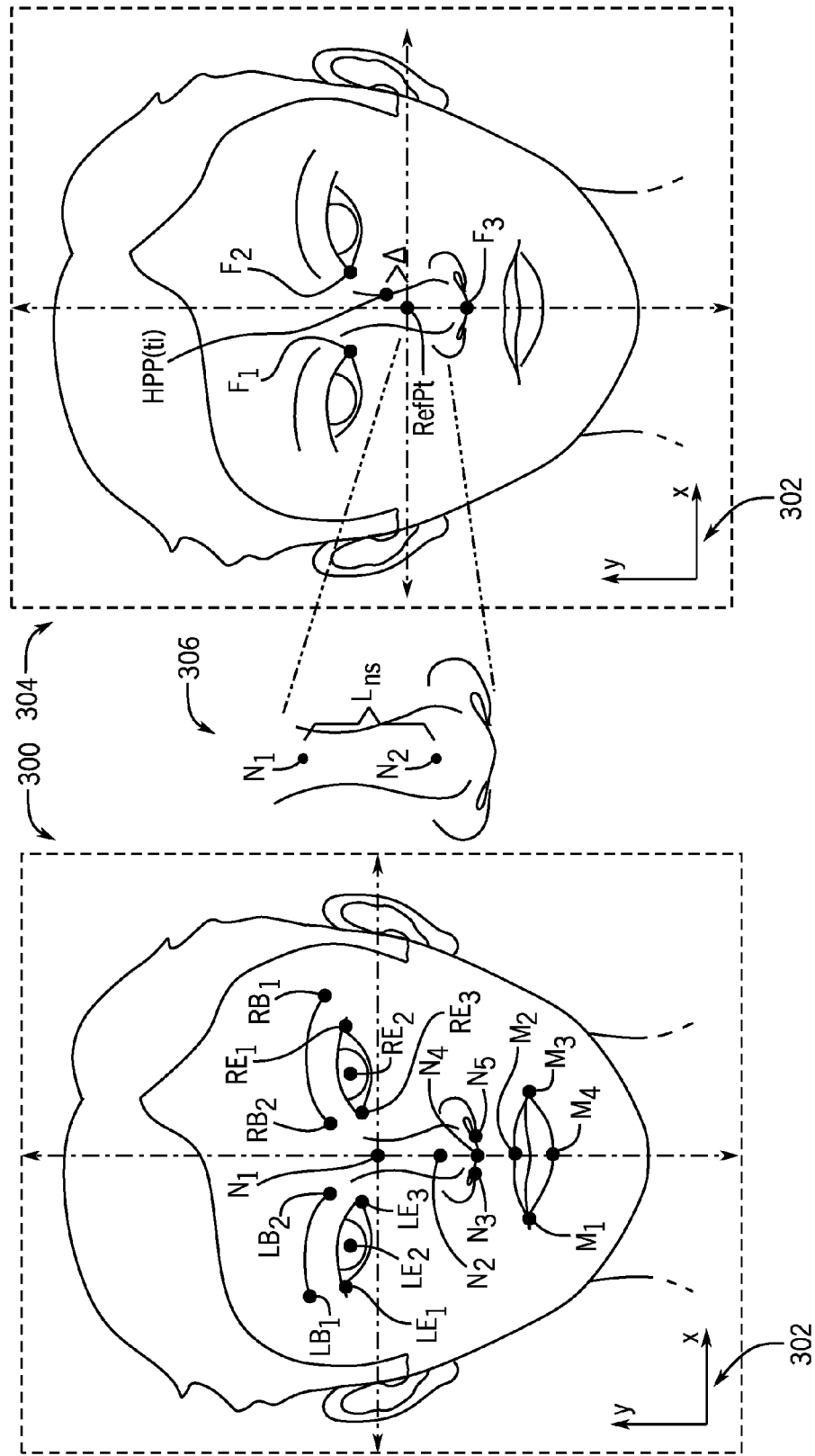

SYSTEM AND METHOD FOR DETECTING DISTRACTION AND A DOWNWARD VERTICAL HEAD POSE IN A VEHICLE

BACKGROUND

New technologies and connected vehicle environments have increased driver distraction in vehicles. In particular, driver interaction with mobile devices, vehicle controls, and vehicle interfaces, have increased the likelihood of driver distraction causing the driver to ignore the primary task of driving.

Various technologies have been implemented within vehicles to determine driver distraction. For example, driver distraction can be determined using eye gaze detection, head pose detection, object detection, among others. However, due to the dynamic nature of the human body, individual driver characteristics (e.g., height, facial features), individual driving habits, and different vehicle configurations, these technologies can be lead to imprecise results and errors in driver distraction detection.

BRIEF DESCRIPTION

According to one aspect, a computer-implemented method for detecting a head pose in a vehicle includes receiving images of a vehicle occupant located in the vehicle from an imaging device and selecting facial feature points from a plurality of facial feature points extracted from the images. The method includes calculating a head pose point based on normalizing the selected facial feature points, determining the head pose based on a change in position of the head pose point over a period of time T, and controlling one or more vehicle systems of the vehicle based on the head pose.

According to another aspect, a system for detecting a head pose in a vehicle includes an imaging device operably connected for computer communication with the vehicle. The imaging device captures images of a face of a vehicle occupant located in the vehicle. Further, a processor is operably connected for computer communication with the imaging device and the vehicle. The processor extracts a plurality of facial feature points from the images and selects facial feature points from the plurality of facial feature points. Each of the selected facial feature points have a position on a plane of the images. The processor calculates a head pose point as a vertical normalization of the positions of the selected facial feature points and determines the head pose based on a change in position of the head pose point over a period of time T. One or more vehicle systems are operably connected for computer communication to the processor and the vehicle. The processor controls the one or more vehicle systems based on the head pose.

According to a further aspect, a non-transitory computer-readable medium for detecting a head pose in a vehicle includes instructions stored thereon, that when executed by a processor perform a method. The method includes receiving images of a vehicle occupant located in the vehicle from an imaging device. The method includes calculating a head pose point by calculating a normalized centroid of facial feature points selectively identified from the images, determining the head pose based on a change in position of the head pose point over a period of time T, and controlling a function of one or more vehicle systems of the vehicle based on the head pose.

BRIEF DESCRIPTION OF THE DRAWINGS

FIG. 3A is an illustrative image of a head of a vehicle occupant for feature point extraction according to an exemplary embodiment;

FIG. 3B is a simplified illustrative image of the image shown in in FIG. 3A, including a head pose point and a reference point according to an exemplary embodiment.

DETAILED DESCRIPTION

Figure 1B:
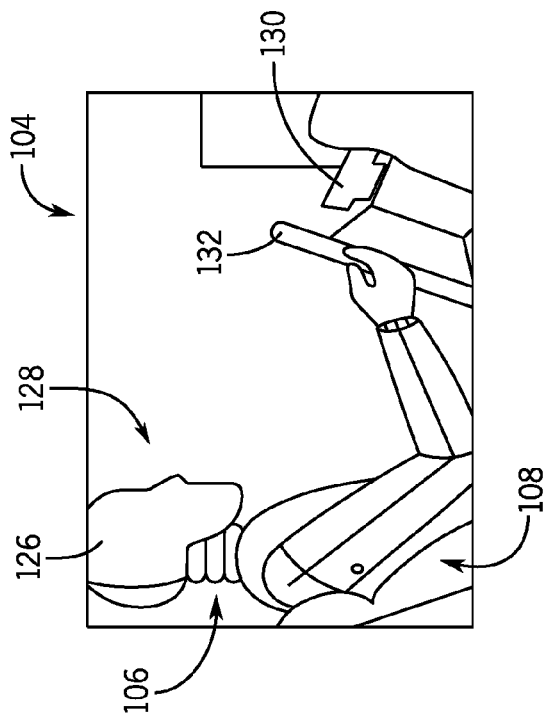
FIG. 1B is a schematic diagram of an interior of the vehicle shown in FIG. 1A including a vehicle occupant and an imaging device according an exemplary embodiment.

The following includes definitions of selected terms employed herein. The definitions include various examples and/or forms of components that fall within the scope of a term and that can be used for implementation. The examples are not intended to be limiting. Further, the components discussed herein, can be combined, omitted or organized with other components or into organized into different architectures.

A "bus," as used herein, refers to an interconnected architecture that is operably connected to other computer components inside a computer or between computers. The bus can transfer data between the computer components. The bus can be a memory bus, a memory processor, a peripheral bus, an external bus, a crossbar switch, and/or a local bus, among others. The bus can also be a vehicle bus that interconnects components inside a vehicle using protocols such as Media Oriented Systems Transport (MOST), Processor Area network (CAN), Local Interconnect network (LIN), among others.

"Component", as used herein, refers to a computer-related entity (e.g., hardware, firmware, instructions in execution, combinations thereof). Computer components may include, for example, a process running on a processor, a processor, an object, an executable, a thread of execution, and a computer. A computer component(s) can reside within a process and/or thread. A computer component can be localized on one computer and/or can be distributed between multiple computers.

"Computer communication", as used herein, refers to a communication between two or more computing devices (e.g., computer, personal digital assistant, cellular telephone, network device) and can be, for example, a network transfer, a file transfer, an applet transfer, an email, a hypertext transfer protocol (HTTP) transfer, and so on. A computer communication can occur across, for example, a bus, a wireless system (e.g., IEEE 802.11), an Ethernet system (e.g., IEEE 802.3), a token ring system (e.g., IEEE 802.5), a local area network (LAN), a wide area network (WAN), a point-to-point system, a circuit switching system, a packet switching system, among others.

"Computer-readable medium," as used herein, refers to a non-transitory medium that stores instructions and/or data. A computer-readable medium can take forms, including, but not limited to, non-volatile media, and volatile media. Non-volatile media can include, for example, optical disks, magnetic disks, and so on. Volatile media can include, for example, semiconductor memories, dynamic memory, and so on. Common forms of a computer-readable medium can include, but are not limited to, a floppy disk, a flexible disk, a hard disk, a magnetic tape, other magnetic medium, an ASIC, a CD, other optical medium, a RAM, a ROM, a memory chip or card, a memory stick, and other media from which a computer, a processor or other electronic device can read.

A "database," as used herein, is used to refer to a table. In other examples, "database" can be used to refer to a set of tables. In still other examples, "database" can refer to a set of data stores and methods for accessing and/or manipulating those data stores. A database can be stored, for example, at a disk and/or a memory.

A "disk," as used herein can be, for example, a magnetic disk drive, a solid-state disk drive, a floppy disk drive, a tape drive, a Zip drive, a flash memory card, and/or a memory stick. Furthermore, the disk can be a CD-ROM (compact disk ROM), a CD recordable drive (CD-R drive), a CD rewritable drive (CD-RW drive), and/or a digital video ROM drive (DVD ROM). The disk can store an operating system that controls or allocates resources of a computing device.

An "input/output device" (I/O device) as used herein can include devices for receiving input and/or devices for outputting data. The input and/or output can be for controlling different vehicle features which include various vehicle components, systems, and subsystems. Specifically, the term "input device" includes, but it not limited to: keyboard, microphones, pointing and selection devices, cameras, imaging devices, video cards, displays, push buttons, rotary knobs, and the like. The term "input device" additionally includes graphical input controls that take place within a user interface which can be displayed by various types of mechanisms such as software and hardware based controls, interfaces, or plug and play devices. An "output device" includes, but is not limited to: display devices, and other devices for outputting information and functions.

A "electronic circuitry," as used herein, includes, but is not limited to, hardware, firmware, a non-transitory computer readable medium that stores instructions, instructions in execution on a machine, and/or to cause (e.g., execute) an action(s) from another electronic circuitry, module, method and/or system. Electronic circuitry can include and/or be a part of a processor controlled by an algorithm, a discrete logic (e.g., ASIC), an analog circuit, a digital circuit, a programmed logic device, a memory device containing instructions, and so on. Logic can include one or more gates, combinations of gates, or other circuit components. Where multiple logics are described, it can be possible to incorporate the multiple logics into one physical logic. Similarly, where a single logic is described, it can be possible to distribute that single logic between multiple physical logics.

A "memory," as used herein can include volatile memory and/or nonvolatile memory. Non-volatile memory can include, for example, ROM (read only memory), PROM (programmable read only memory), EPROM (erasable PROM), and EEPROM (electrically erasable PROM). Volatile memory can include, for example, RAM (random access memory), synchronous RAM (SRAM), dynamic RAM (DRAM), synchronous DRAM (SDRAM), double data rate SDRAM (DDRSDRAM), and direct RAM bus RAM (DRRAM). The memory can store an operating system that controls or allocates resources of a computing device.

An "operable connection," or a connection by which entities are "operably connected," is one in which signals, physical communications, and/or logical communications can be sent and/or received. An operable connection can include a wireless interface, a physical interface, a data interface, and/or an electrical interface.

A "portable device", as used herein, is a computing device typically having a display screen with user input (e.g., touch, keyboard) and a processor for computing. Portable devices include, but are not limited to, handheld devices, mobile devices, smart phones, laptops, tablets and e-readers.

A "processor," as used herein, processes signals and performs general computing and arithmetic functions. Signals processed by the processor can include digital signals, data signals, computer instructions, processor instructions, messages, a bit, a bit stream, that can be received, transmitted and/or detected. Generally, the processor can be a variety of various processors including multiple single and multi-core processors and co-processors and other multiple single and multicore processor and co-processor architectures. The processor can include logic circuitry to execute actions and/or algorithms.

A "vehicle," as used herein, refers to any moving vehicle that is capable of carrying one or more human occupants and is powered by any form of energy. The term "vehicle" includes, but is not limited to cars, trucks, vans, minivans, SUVs, motorcycles, scooters, boats, go-karts, amusement ride cars, rail transport, personal watercraft, and aircraft. In some cases, a motor vehicle includes one or more engines. Further, the term "vehicle" can refer to an electric vehicle (EV) that is capable of carrying one or more human occupants and is powered entirely or partially by one or more electric motors powered by an electric battery. The EV can include battery electric vehicles (BEV) and plug-in hybrid electric vehicles (PHEV). The term "vehicle" can also refer to an autonomous vehicle and/or self-driving vehicle powered by any form of energy. The autonomous vehicle can carry one A "vehicle system," as used herein can include, but is not limited to, any automatic or manual systems that can be used to enhance the vehicle, driving, and/or safety. Exemplary vehicle systems include, but are not limited to: an electronic stability control system, an anti-lock brake system, a brake assist system, an automatic brake prefill system, a low speed follow system, a cruise control system, a collision warning system, a collision mitigation braking system, an auto cruise control system, a lane departure warning system, a blind spot indicator system, a lane keep assist system, a navigation system, a transmission system, brake pedal systems, an electronic power steering system, visual devices (e.g., camera systems, proximity sensor systems), a climate control system, an electronic pretensioning system, a monitoring system, a passenger detection system, a vehicle suspension system, a vehicle seat configuration system, a vehicle cabin lighting system, an audio system, a sensory system, an interior or exterior camera system among others.

A "vehicle occupant," as used herein can include, but is not limited to, a biological organism located in a vehicle. The vehicle occupant can be a human, a baby, a child, a pet, among others. The vehicle occupant can be a driver of the vehicle or a passenger of the vehicle.

A "vehicle sensor," as used herein can include, but is not limited to, any sensor used in any vehicle system for detecting a parameter of that system. Exemplary vehicle sensors include, but are not limited to: acceleration sensors, speed sensors, braking sensors, proximity sensors, vision sensors, seat sensors, seat-belt sensors, door sensors, environmental sensors, yaw rate sensors, steering sensors, GPS sensors, among others.

A "wearable computing device", as used herein can include, but is not limited to, a computing device component (e.g., a processor) with circuitry that can be worn or attached to user. In other words, a wearable computing device is a computer that is subsumed into the personal space of a user. Wearable computing devices can include a display and can include various sensors for sensing and determining various parameters of a user. For example, location, motion, and physiological parameters, among others. Some wearable computing devices have user input and output functionality. Exemplary wearable computing devices can include, but are not limited to, watches, glasses, clothing, gloves, hats, shirts, jewelry, rings, earrings necklaces, armbands, shoes, earbuds, headphones and personal wellness devices.

I. System for Detecting Driver Distraction and a Downward Vertical Head Pose

Figure 1A:
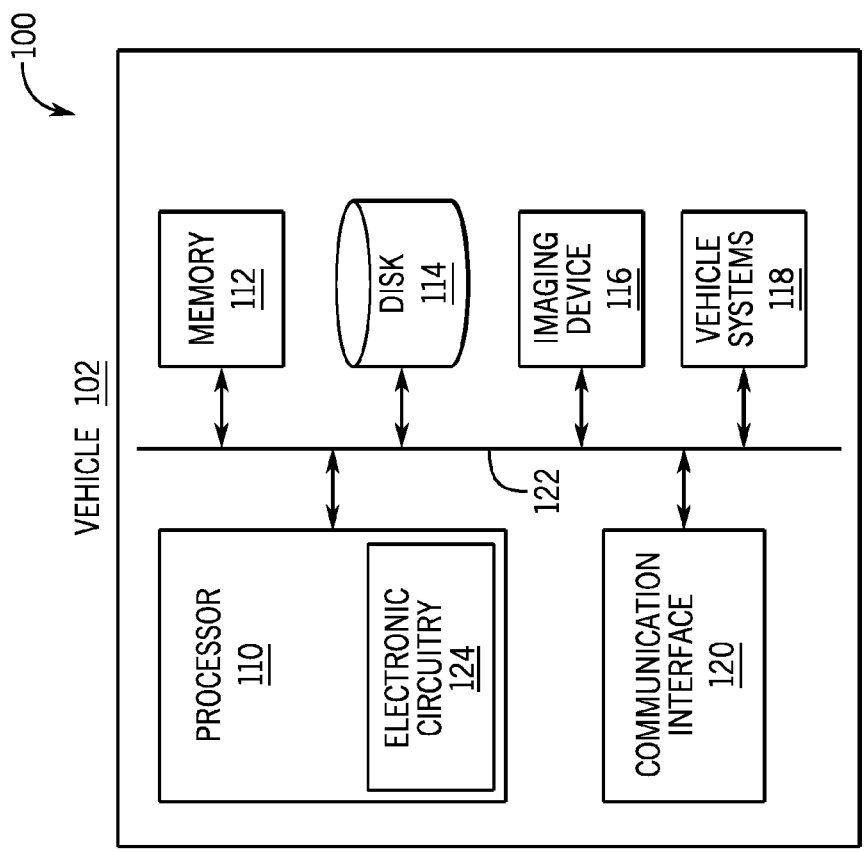
FIG. 1A a schematic diagram of an exemplary system for detecting driver distraction and a downward vertical head pose in a vehicle according to an exemplary embodiment.

Referring now to the drawings, wherein the showings are for purposes of illustrating one or more exemplary embodiments and not for purposes of limiting the same, FIG. 1A is a schematic diagram of an exemplary system for detecting driver distraction and a downward vertical head pose in a vehicle according to an embodiment. Further, FIG. 1B is a schematic diagram of the interior of the vehicle shown in FIG. 1A including a vehicle occupant according to an exemplary embodiment. The components of the system shown in FIGS. 1A and 1B, as well as the components of other systems, hardware architectures, and software architectures discussed herein, can be combined, omitted, or organized into different architectures for various embodiments, including embodiments utilized outside of a vehicle.

As can be seen in FIG. 1A, a system 100 for detecting head pose can include and be implemented with a vehicle 102. An exemplary interior 104 of the vehicle 102 is shown in FIG. 1B. In FIG. 1B, a vehicle occupant (e.g., a driver) 106 is located in the vehicle 102 positioned on a vehicle seat 108. The vehicle 102 can include a processor 110, a memory 112, a disk 114, an imaging device 116, one or more vehicle systems 118, and a communication interface 120. These components can be operatively connected for computer communication via a bus 122 and/or other wired or wireless technologies as facilitated by the communication interface 120. The communication interface 120 provides software and hardware to facilitate data input and output between the components of the vehicle 102 and other components outside of the vehicle 102, for example, networks and other vehicles (not shown). In some embodiments, the communication interface 120 can include a network interface controller (not shown). The network interface controller can be hardware (e.g., a card, a circuit board) that manages/monitors connections and controls bi-directional data transfer between the communication interface 120 and other components of the system 100.

Further, the processor 110 can include electronic circuitry 124. As described above, the processor 110 with the electronic circuitry 124 can include hardware, firmware, and software architecture frameworks (e.g., kernels, libraries, drivers, APIs) for facilitating data processing with the components of the system 100. It is understood that the vehicle 102 can include other computing components not shown, for example, input/output devices (e.g., vehicle display, touch interfaces, keyboards). Further, the computing components shown can be implemented in part or in whole with another device, for example, a portable device (not shown) communicatively coupled to the vehicle 102.

Generally, the components shown in FIGS. 1A and 1B facilitate detection of a head pose in the vehicle 102 and control of one or more vehicle systems 118 based on the detected head pose. As discussed herein, the head pose can be a vertical head pose with an orientation in an upward or downward direction (e.g., a head direction) within a plane. Thus, the head pose can be expressed by an x-axis component and a y-axis component in the direction which the head is oriented. Accordingly, a head pose with an orientation in an upward direction has a pitch (e.g., tilt) in a positive y-axis direction. A head pose with an orientation in a downward direction has a pitch (e.g., tilt) in a negative y-axis direction. A head pose with a neutral orientation (e.g., neutral head pose) is directed straight ahead (e.g., 0 y-axis component). In other embodiments, the head pose can be expressed by an x-axis component, a y-axis component, and a z-axis component in the direction which the head is oriented. It is understood that other coordinate, plane, or position systems can be used to express the orientation of the head pose. As discussed herein, vertical head pose does not include horizontal head pose with an orientation in a right direction (i.e., in a positive x-axis direction) or a left direction (i.e., a negative x-axis direction). However, the vertical head pose can have some rotation in a horizontal direction. Further, head pose, as discussed herein, does not include eye gaze.

In some embodiments discussed herein, the methods and systems facilitate detection of a head pose oriented in a downward direction, and more specifically, a head down pose. The head pose can be oriented in a downward direction at different variations (e.g., varying levels, degrees, angles, positions in a downward direction) from a neutral head pose and/or one or more points/positions (e.g., point, 0 y-axis component) on a plane. For example, a head pose can be oriented in a slight downward variation, a very small downward variation, a small downward variation, a large downward variation, a very large downward variation, and extremely large variation, among others. Thus, numerical or other kinds of values can be determined and/or used (e.g., thresholds) to distinguish between different variations of a head pose in a downward direction from one or more points/positions.

Moreover, in some embodiments, the head pose can indicate a driver state or a driver state level, for example, slightly alert, somewhat alert, alert, slightly distracted, somewhat distracted, distracted, very distracted, extremely distracted, among others. As an illustrative example, a head pose oriented in a very small downward variation can indicate a slightly alert driver state. A head pose oriented in a very large downward orientation can indicate a very distracted driver state. A head pose oriented in a head down pose can indicate a distracted state.

To detect and determine a head pose, the imaging device 116 can capture images of the vehicle occupant 106, for example, a head 126 including a face 128 of the vehicle occupant 106 as shown in FIG. 1B. Here, the head 126 is directed towards a forward field of view of the vehicle 102. In FIG. 1A, the imaging device 116 is operably connected for computer communication with the vehicle 102. The imaging device 116 can include one or more cameras or other imaging devices and sensing devices. For example, the imaging device 116 can be one or more stereo cameras, three-dimensional cameras, remote sensing devices (e.g., LIDAR, lasers, sensors), among others. Further, in some embodiments, the imaging device 116 can include facial recognition and tracking systems. In some embodiments, the processor 110 can also facilitate facial recognition and tracking.

In FIG. 1B, the imaging device 116 is shown as a camera 130. The camera 130 is located on an upper column cover of a steering wheel 132. However, the camera 130 can be implemented with other configurations and located in other positions. For example, in one embodiment, the camera 130 can be located underneath the steering wheel 132. As will be discussed herein, the camera 130 can continuously capture images of the head 126, including the face 128 of the vehicle occupant 106, and track the head 126 over time. Further, in some embodiments, the camera 130 can detect and track an eye gaze of the vehicle occupant 106.

II. Methods for Detecting a Downward Vertical Head Pose

The components of FIGS. 1A and 1B will now be described with reference to several exemplary methods and illustrative examples. As mentioned above, the methods discussed herein generally disclose detection of a head pose of the vehicle occupant 106 in the vehicle 102, namely, a downward vertical head pose (e.g., a head pose oriented in a downward direction). Determination of a vertical head pose (e.g., oriented in an upward, neutral, or downward orientation) can be affected by different variables including the configuration of the vehicle 102, the configuration of the vehicle seat 108 (e.g., height, fore/aft direction), the posture of the vehicle occupant 106 (e.g., slouching, leaning), and the movement of the vehicle occupant 106, among others. Accordingly, the systems and methods discussed herein consider these variables to distinguish a head pose oriented in a downward direction from other head pose orientations (e.g., upward, neutral), and to distinguish different variations of the head pose oriented in a downward direction (e.g., slightly downward variation, small downward variation, large downward variation).

More specifically, the systems and methods discussed herein can determine a head down pose from a head pose oriented in a downward direction. A head down pose is a head pose oriented in a downward direction in such a way that the vehicle occupant 106 is ignoring the primary task of driving. In another embodiment, a head down pose is a head pose movement pattern oriented in a downward direction in such a way that the vehicle occupant 106 is ignoring the primary task of driving. Thus, a head down pose can indicate a driver state, for example, a distracted driver state. The head down pose can be different for different vehicle occupants because of the dynamic variables discussed above. Thus, a head pose oriented in a slightly downward variation may not be a head down pose. Instead, the slightly downward variation could indicate a vehicle occupant is slouching or in a low profile posture. Thus, the methods and systems described herein account for these variables to provide a determination of a head pose oriented in a downward direction that can cause driver distraction.

A. Image Capture and Processing

Figure 2:
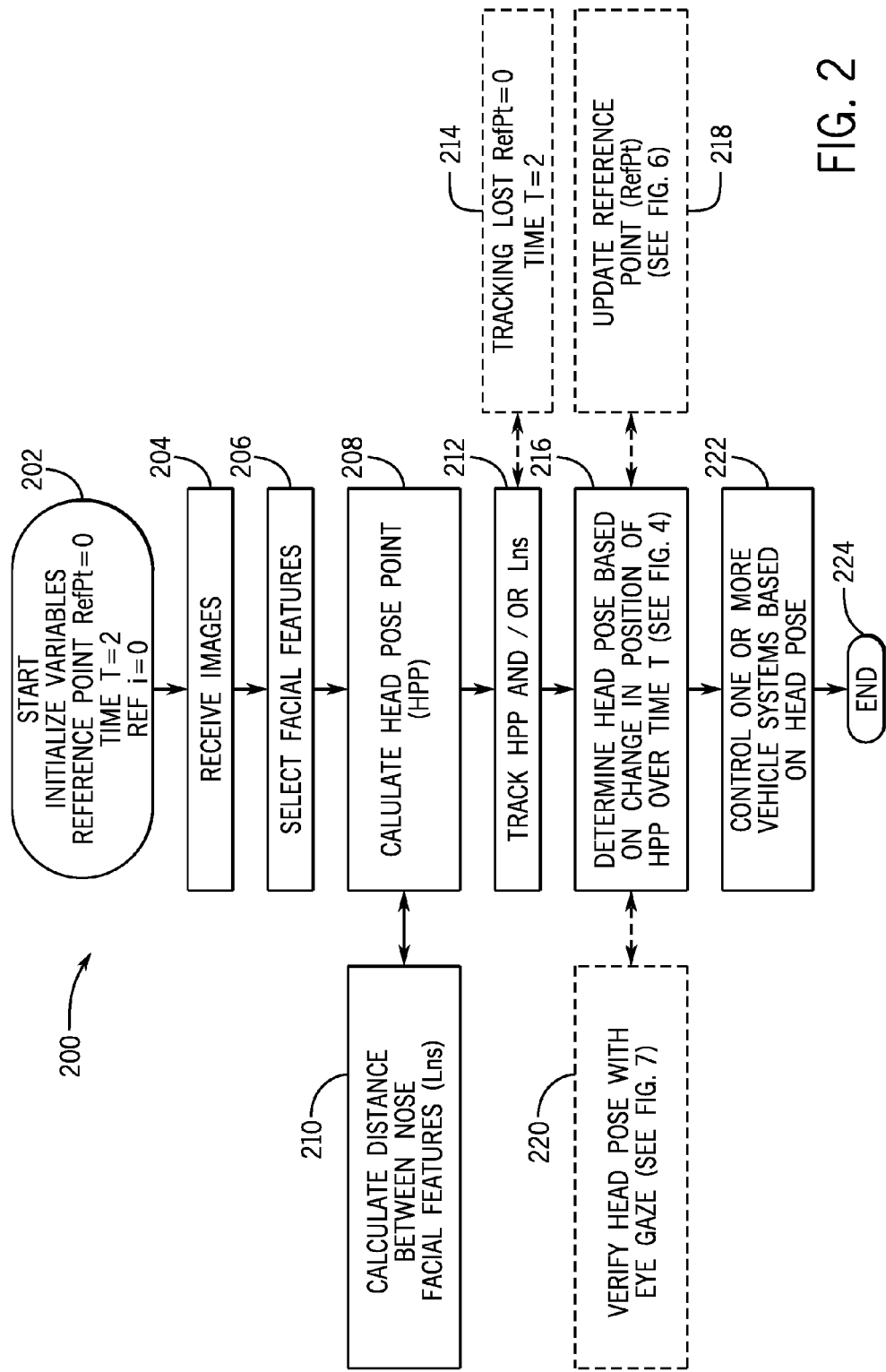
FIG. 2 is a flowchart diagram of an exemplary method for detecting a vertical head pose in a vehicle according to an exemplary embodiment.

In FIG. 2, and with reference to FIGS. 1A and 1B, an exemplary method 200 for detecting a head pose in a vehicle according to an embodiment is shown. The method 200 starts at block 202 and can include initializing variables (e.g., system/global variables) to be used throughout the methods described herein. In other embodiments, the variables can be initialized at other blocks, individually or globally. The variables can be maintained by the processor 110 and stored, for example, at the memory 112 and/or the disk 114. The processor 110 and other components of the vehicle 102 can use the variables for processing the functions described herein. In one embodiment, the variables include a reference point (RefPt), a time period (T) and a reference counter (Ref_i). These variables will be discussed in more detail herein. Initially, the reference point RefPt is set to a value of zero (0), the time period T is set to a default time value (e.g., seconds, minutes) of two (2) seconds, and the reference counter Ref_i is set to a value of zero (0). In other embodiments, the variables discussed herein can be initialized to other values, discrete or continuous.

At block 204, the method 200 includes receiving images of a vehicle occupant located in the vehicle from an imaging device. For example, the imaging device 116 (e.g., the camera 130) can capture images of the head 126 including the face 128 of the vehicle occupant 106. The processor 110 can receive the images as input from the imaging device 116. The images can be received continuously or at periodic time intervals from the imaging device 116. FIG. 3A is a schematic diagram of an image 300 for feature extraction processing received from the imaging device 116 showing the vehicle occupant 106. In FIG. 3A, the image 300 is an image of the head 126 of the vehicle occupant 106 showing a frontal view of the face 128 (e.g., towards a forward field of view of the vehicle 102).

The images captured from the imaging device 116 can be processed for feature extraction and/or facial recognition by the processor 110 and/or the imaging device 116. In particular, at block 206, the method 200 includes selecting facial feature points from a plurality of facial feature points extracted from the images. Thus, in some embodiments, the processor 110 extracts a plurality of facial feature points from the image 300 and selects facial feature points from the plurality of facial feature points. Known feature extraction and/or recognition techniques can be used to process the image 300 and extract the plurality of facial feature points from the images. For example, the plurality of facial feature points can be extracted from image data from the image 300 by searching feature points based on face geometry algorithms and matching. Feature points can be of different types, for example, region, landmark, and contour. In FIG. 3A, the image 300 shows a plurality of extracted facial feature points, namely facial feature landmarks. The extracted facial feature points shown in FIG. 3A are described in Table 1.

TABLE 1

| Reference Number | Detected Feature Point |
| --- | --- |
| $LB_1$ | Outer corner of left eyebrow |
| $LB_2$ | Inner corner of left eyebrow |
| $RB_1$ | Outer corner of right eyebrow |
| $RB_2$ | Inner corner of right eyebrow |
| $LE_1$ | Outer corner of left eye |
| $LE_2$ | Center of left eye (pupil) |
| $LE_3$ | Inner corner of left eye |

TABLE 1-continued

| Reference Number | Detected Feature Point |
|---|---|
| $RE_1$ | Outer corner of right eye |
| $RE_2$ | Center of right eye (pupil) |
| $RE_3$ | Inner corner of right eye |
| $N_1$ | Top of nose bridge |
| $N_2$ | Nose tip |
| $N_3$ | Left Naris (left corner of left nostril) |
| $N_4$ | Columella (connecting tip of nose to base of nose) |
| $N_5$ | Right Naris (right corner of right nostril) |
| $M_1$ | Left mouth corner |
| $M_2$ | Cupid's bow (top of mouth) |
| $M_3$ | Right mouth corner |
| $M_4$ | Bottom of mouth |

Each of the facial feature points can have a position on a plane of the image 300. In FIG. 3A, the image 300 has a two-dimensional (2D) pixel plane 302 with a coordinate system having a y-axis component and an x-axis component. It is understood that in other embodiments, the image 300 can have a three-dimensional (3D) pixel plane with a coordinate system having an x-axis component, a y-axis component, and a z-axis component. Positions of each facial feature point on the image 300 can be expressed in pixel positions along the x-axis and/or the y-axis. In FIG. 3A, the head 126 has a neutral pose and is centered within the plane at an origin (0, 0) of the x-axis and y-axis at point $N_1$. Further, in FIG. 3A, the face 128 is in a straightforward and fixed pose with relaxed muscles (i.e., no active muscle movement). The head 126 is shown in FIG. 3A this way to simplify the explanation herein but it should be apparent that in other embodiments, the origin can be positioned on any location of the image 300.

To determine a head pose, the processor 110 can selectively identify facial feature points within the plurality of facial feature points. The processor can select any number of the plurality of facial feature points, for example, two, three, or more than three. Referring again to FIG. 2, in some embodiments, at block 206, selecting the facial feature points includes selecting fixed facial features points from the plurality of facial feature points. The fixed facial features points having positions unaffected by movement of other facial feature points. As mentioned above, in FIG. 3A, the head 126 has a head pose oriented in a neutral direction and the face 128 is relaxed in a straightforward fixed pose. As muscles beneath the skin of the face 128 move, the facial feature points can move. For example, the vehicle occupant 106 can talk or express a facial expression causing movement of the muscles beneath the skin of the face 128. This movement and/or facial expression can convey a state of the vehicle occupant 106, for example, happiness, sadness, disgust, surprise, laughter, among others. As the muscles of the face 128 move, the positions of the facial feature points can move from their original positions (e.g., positions in a relaxed and straightforward fixed pose).

However, certain facial feature points maintain their position or move a relatively small amount in relation to the face 128 when other facial feature points move or are moving. As an illustrative example, when the vehicle occupant 106 yawns, the positions of the facial feature points $M_1$, $M_2$, $M_3$, and $M_4$ change substantially as the mouth opens and widens. However, the positions of the facial feature points $LE_3$ and $RE_3$ remain approximately the same when the facial feature points $M_1$, $M_2$, $M_3$, and $M_4$ move. As another example, if the vehicle occupant 106 expresses surprise, the positions of the facial feature points $LB_2$, $RB_2$, $M_1$, $M_2$, $M_3$, and $M_4$ move, however, the positions of the facial feature points $N_1$ and $N_2$ remain relatively the same. Thus, the selected facial feature points maintain a stable position when exposed to movement from facial expressions. Said differently, the facial feature points are selectively identified based on whether the facial feature points maintain a stable position when the facial feature points are exposed to movement of other facial feature points. In one embodiment, and in the examples discussed herein, the selected facial feature points include the inner corner of the left eye ($LE_3$), the inner corner of the right eye ($RE_3$), and the columella ($N_4$). It is understood that in other embodiments, different facial feature points can be selected. FIG. 3B illustrates an image 304, which is a simplified view of the image 300 of FIG. 3A. In FIG. 3B, the selected facial features, the inner corner of the left eye ($LE_3$), the inner corner of the right eye ($RE_3$), and the columella ($N_4$), are indicated as facial features $F_1$, $F_2$, and $F_3$ respectively.

Referring again to block 206 of FIG. 2, in some embodiments, the processor 110 can use historical data of the facial feature points of the vehicle occupant 106 to select the facial feature points. For example, as the facial feature points are tracked, data concerning the positions of the facial feature points (e.g., the plurality of facial feature points) can be stored at the memory 112 and/or the disk 114. The positions of the facial feature points can be stored and associated with different facial expressions of the vehicle occupant 106. For example, positions of the facial feature points in a straightforward fixed position and positions of the facial feature points in a facial expression can be stored. Further, the displacement (e.g., difference) between positions of the facial feature points in a straightforward fixed position and positions of the facial feature points in a facial expression can be stored. Thus, in some embodiments, the processor 110 can determine which facial feature points of the plurality of facial feature points minimize position displacement based on the difference between the positions of the facial feature points in a straightforward fixed position and positions of the facial feature points in a facial expression.

B. Determining Head Post Point

Referring again to FIG. 2, at block 208 the method 200 includes calculating a head pose point (HPP). In some embodiments, at block 208, calculating a HPP is based on normalizing the selected facial feature points. For example, each position of the selected facial feature points can be normalized into a single value. In some embodiments, the HPP can be calculated as a vertical normalization of the positions of the selected facial feature points. For example, the vertical position component (e.g., y) of the selected facial feature points can be normalized into a single value. Thus, the displacement between the selected facial feature points are normalized into a single value, the HPP. In some embodiments, calculating the HPP by normalizing the selected facial feature points further includes averaging positions of the selected facial feature points. In another embodiment, calculating the HPP by normalizing the selected facial feature points further includes weighting the selected facial feature points based on a confidence level assigned to each of the selected facial feature points. In a further embodiment, calculating the HPP includes calculating a normalized centroid of the facial feature points. These embodiments will be discussed in further detail herein.

Referring again to the example of FIG. 3B discussed above, the selected facial features, the inner corner of the left eye ($LE_3$), the inner corner of the right eye ($RE_3$), and the columella ($N_4$), are indicated as facial features $F_1$, $F_2$, and $F_3$ respectively. Each of the selected facial features have a position on the plane 302 of the image 304 expressed as a pixel position in two-dimensional coordinates. As discussed above, in one embodiment, the processor 110 calculates a head pose point (HPP) by averaging the vertical positions (i.e., y-axis component) of the selected facial features. According to this embodiment, the HPP can be expressed mathematically as:

$$HPP = \frac{F_1(y) + F_2(y) \ldots F_i(y)}{i} \quad (1)$$

where i is a real and finite number of selected facial features.

It is appreciated that in some embodiments, the HPP can be standardized and/or converted to a value in a range between zero and one. In other embodiments, the positions of the selected facial features can be standardized prior to calculating the HPP. In some embodiments, the HPP is calculated over a time period T. For example, the selected facial features can be tracked over the time period T as will be discussed herein. As the selected facial features are tracked, the HPP can be calculated over the time period T and can be expressed in vector format as:

$$HPP(T) = (HPP_{(ti)} \ldots HPP_{(ti)}) \quad (2)$$

Figure 3C:
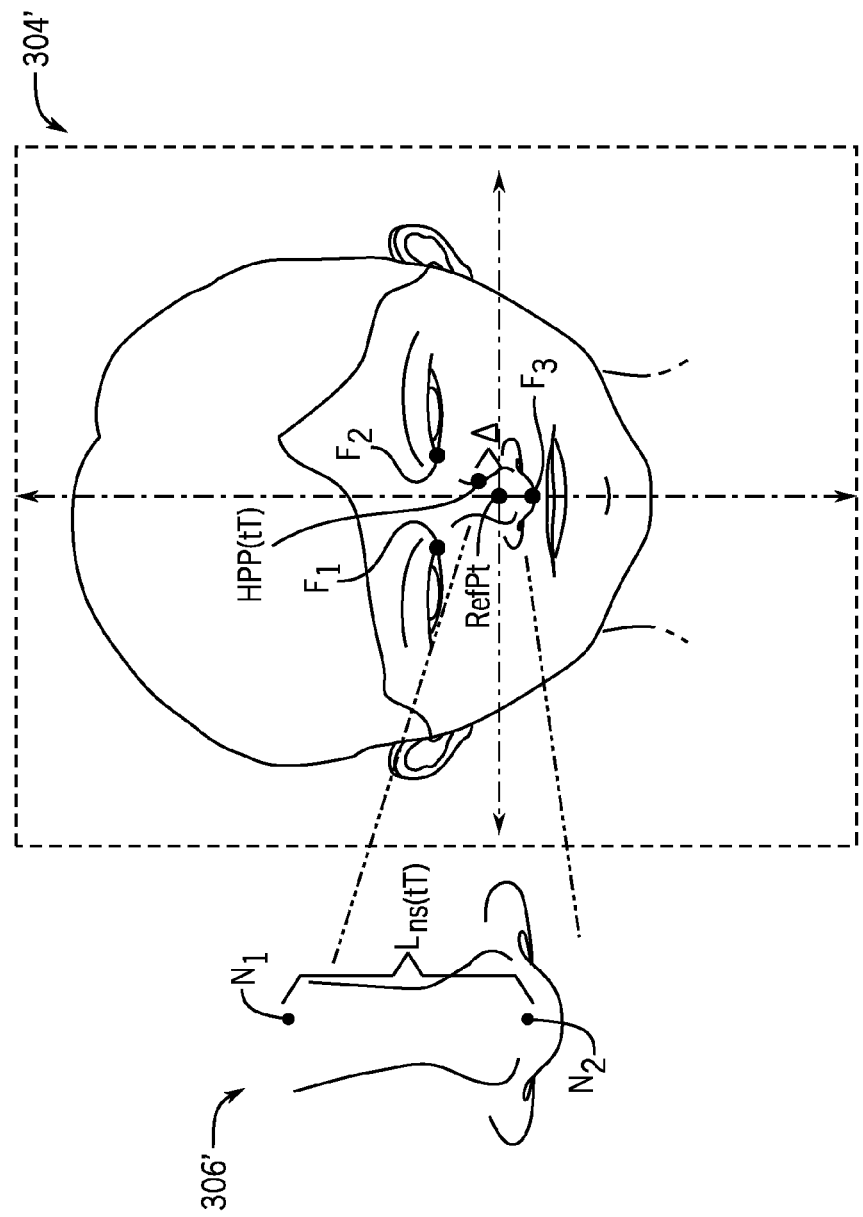
FIG. 3C is an illustrative image similar to the image shown in FIG. 3B, showing a large head pose variation according to an exemplary embodiment.

At block 208, in some embodiments, the HPP can be calculated as an initial value (e.g., $HPP_{(ti)}$, i=1) where the head pose is oriented in a neutral direction (e.g., a straightforward fixed position) towards the forward field of view of the vehicle 102 (e.g., as FIG. 3B). For example, in FIG. 3B a head pose point $HPP_{(ti)}$ is shown based on facial features $F_1$, $F_2$, and $F_3$. This HPP is an average of the vertical positions of the facial features $F_1$, $F_2$, and $F_3$. In some embodiments, the HPP can be calculated at the end of time period T (e.g., $HPP_{(tT)}$). This embodiment will be discussed in more detail with FIG. 3C herein. In other embodiments, the HPP is calculated at different time intervals during the time period T (e.g., where i represents each time interval). Further, in some embodiments discussed herein, the HPP can be determined for more than one time series, for example, a first time period T immediately followed by a second time period T. The first time period T and the second time period T can be of the same length. This can be expressed in vector format as:

$$HPP(T1, T2) = (HPP_{ti} \ldots HPP_{tT1}, HPP_{tT1+1} \ldots HPP_{tT2}) \quad (3)$$

Although the examples discussed herein refer to vertical positions only as noted in equation (1), in other embodiments, the HPP can be calculated by using horizontal positions (i.e., x-axis component) and vertical positions (i.e., y-axis component). This can be expressed mathematically as:

$$HPP = \frac{1}{i}\left(\sum F_1(x) \ldots F_i(x), \sum F_1(y) \ldots F_i(y)\right) \quad (4)$$

where i is a real and finite number of selected facial features.

As discussed above, in some embodiments, calculating the HPP by normalizing the selected facial feature points further includes weighting the selected facial feature points based on a confidence level assigned to each of the selected facial feature points. In this embodiment, during feature extraction processing, confidence levels can be assigned to the selected facial feature points. Calculating the HPP can be based on these confidence levels. For example, the processor 110 can determine whether the confidence level associated with each of the selected facial feature points is a low confidence value or a high confidence value (e.g., by comparing the confidence level to a predetermined threshold).

In some embodiments, a low confidence value can indicate the position estimate of the selected facial feature point is not available, the selected facial feature point is not visible, poor lighting conditions and/or occlusion exists, among other conditions. Accordingly, based on this determination, the processor 110 can calculate the HPP with a weight associated with each of the selected facial feature points. The weight can be a function of the confidence level associated with the selected facial feature point. In some embodiments, a weighted average is implemented only upon determining the selected facial feature point is associated with a low confidence value. According to this embodiment, equation (1) can be rewritten as:

$$HPP = \frac{w_1 * F_1(y) + w_2 * F_2(y) \ldots w_i * F_i(y)}{i} \quad (5)$$

where i is a real and finite number of selected facial features and w indicates a weighted value associated with the selected facial feature.

In addition to determining the HPP, the method 200 can also include at block 210 calculating a distance between nose facial feature points. In other embodiments, a magnitude between the nose facial feature points can be determined. More specifically, a Euclidian vertical (i.e., y-axis component) distance between two nose facial feature points is determined. The processor 110 can identify the two nose facial feature points, for example, at block 206. In FIG. 3B, an exploded view 306 of the nose in image 304 is shown. Two nose facial feature points are shown in view 306, the top of the nose bridge ($N_1$) and the nose tip ($N_2$).

Thus, in one embodiment, the nose facial feature points define a length of the nose (e.g., the length of the septum of the nose). It is understood that different nose facial feature points other than those shown in FIG. 3B can be used. The nose facial feature points also have a position within the plane 302 of the image 304. The distance between the nose facial feature points according to the illustrative example shown in FIG. 3B can be expressed mathematically as:

$$L_{ns} = N_1(y) - N_2(y) \quad (6)$$

The distance between the nose facial feature points can also be standardized and/or converted to a value within a range of zero and one. Further, the distance between the nose facial feature points can also be calculated over a time period T. For example, the nose facial feature points can be tracked over the time period T as will be discussed herein. As the nose facial feature points are tracked, the $L_{ns}$ can be calculated over the time period T and can be expressed in vector format as:

$$L_{ns} = (L_{ns(ti)} \ldots L_{ns(tT)}) \quad (7)$$

Similar to calculating the HPP as discussed above, the distance between the nose facial feature points can be calculated as an initial value (e.g., $L_{ns(ti)}$ where i=1) at the beginning of the time period T (e.g., where the head pose is in a straightforward fixed position towards the forward field of view of the vehicle 102, as shown in FIG. 3B). In some embodiments, $L_{ns}$ can be calculated at the end of time period T (e.g., $L_{ns(tT)}$). This embodiment will be discussed with FIG. 3C herein. In other embodiments, $L_{ns}$ is calculated at different time intervals during the time period T (e.g., where i represents each time interval). Further, in some embodiments discussed herein, $L_{ns}$ can be determined for more than one time series, for example, a first time period T immediately followed by a second time period T. The first time period T and the second time period T can be of the same length.

C. Determining Head Pose Over Time

As mentioned above, the facial feature points can be tracked over a period of time, for example a period of time T. Additionally, the head pose point (HPP) and and/or the distance between nose facial feature points ($L_{ns}$) can be tracked over a period of time, for example the period of time T. Thus, with reference again to FIG. 2, the method 200 can include at block 212, tracking the head pose point (HPP) and/or the distance between nose facial feature points ($L_{ns}$). As discussed above with FIG. 1A, the imaging device 116 and/or the processor 110 can include a tracking system to track the extracted facial feature points and therefore track the HPP and/or the $L_{ns}$.

As will be understood more fully throughout the description, different components of the methods described herein can occur in parallel while tracking the head 126 and the selected facial features at block 212. For example, in situations where tracking is lost, in some embodiments, error handling can occur at block 214. Tracking errors can include, but are not limited to, malfunctions of the hardware (e.g., the imaging device 116), connectivity issues between the components of the system 100, and feature extraction errors (e.g., occlusion, lighting). At block 214, it is determined if tracking has been lost (e.g., data from tracking is not being received and/or the data is incorrect). In some embodiments, determining if tracking has been lost includes determining if tracking is lost for a predetermined period of time, for example, five (5) seconds. At block 214, if tracking is lost, the variables are reset to default values for further processing. Specifically, the RefPt is set to zero (0) and the time period T is set to two (2) seconds, although it is understood that the variables can be reset to other values. After the variables are reset, the method 200 continues tracking at block 212.

Based on the tracking at block 212, the head pose can be determined over the period of time T. Specifically, in the embodiment shown in FIG. 2, at block 216, the method 200 can include determining the head pose based on a change in position of the head pose point over a period of time T. In other embodiments, which will be discussed herein, determining the head pose can be based on a change in position of the head pose point over a period of time T and a change in a distance between nose facial feature points over a period of time T.

In some embodiments, the change in position of the head pose point (HPP) is determined relative to a reference point (RefPt). The RefPt is a baseline vertical (i.e., y-axis component) value used to determine the head pose. Said differently, the RefPt is a normalized baseline value specific to a vehicle occupant to determine a head down pose. As will be discussed in more detail herein, the RefPt can be a learned variant (e.g., a learned value) of the HPP. More specifically, the RefPt can be updated (e.g. learned) in real-time based on the HPP. As mentioned above with block 202, the RefPt is initially set to zero (0). Thus, as shown in FIG. 3B, the RefPt is positioned at the origin of the plane 302, where the x-axis and the y-axis meet. However, in other embodiments, the RefPt can be initialized to a different value. For example, the initial value of the RefPt can be stored and retrieved by the processor 110 from the memory 112 and/or the disk 114.

Figure 4:
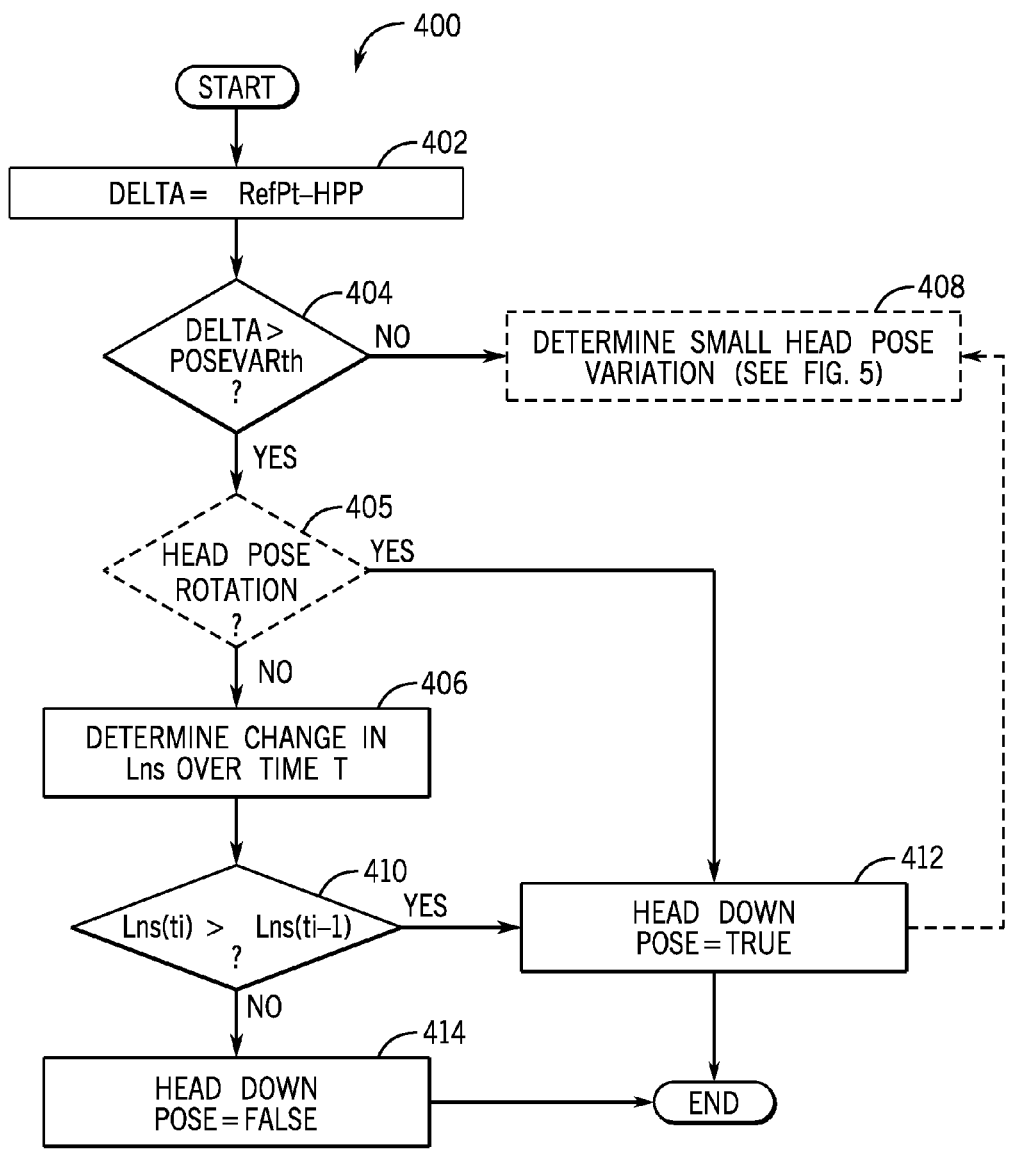
FIG. 4 is a flowchart diagram of an exemplary method for determining head pose for a large head pose variation according to an exemplary embodiment.

Referring now to FIG. 4, a detailed exemplary method 400 for determining the head pose will be described. In one embodiment, determining the head pose further includes calculating a difference between a head pose point (HPP) and a reference point (RefPt) at block 402. As discussed above, the RefPt is a baseline value used for determining head pose and can be a learned value based on the HPP. In the embodiments discussed herein, the RefPt is a value indicating a vertical (i.e., y-axis component) position on a plane of an image. The difference between the HPP and the RefPt indicates a change in position from the RefPt. Calculating the difference between the HPP and the RefPt can be expressed mathematically as:

$$\text{Delta}(\Delta) = \text{RefPt} - \text{HPP} \quad (8)$$

Accordingly, Delta ($\Delta$) provides an estimation of a change in head pose position based on a current normalized value of extracted facial features and a real-time learned normalized value of said extracted facial features. These values (e.g., the HPP, the RefPt, and Delta ($\Delta$)) are provided and analyzed without consideration to a reference frame of the vehicle 102 or a reference frame of the imaging device 116.

i. Determining Head Post Based on Large Head Pose Variation

As discussed herein, a head pose oriented in a downward direction can be distinguished at different variations. Thus, in some embodiments, determining the head pose, can include identifying a large head pose variation or a small head pose variation based on calculating a difference between a head pose point (HPP) and a reference point (RefPt). In the embodiments discussed herein, to determine a head pose based on a small head pose variation, a position of the variation (e.g., a pattern of movement) is tracked over time. Conversely, in some of the embodiments discussed herein, to determine a head pose based on a large head pose variation, a distance between nose facial feature points ($L_{ns}$) is tracked over time.

Accordingly, in one embodiment as shown in FIG. 4, at block 404, the method 400 can include comparing the change in position of the head pose to a pose variation threshold (POSEVARth) to determine if the change in position of the head pose is a large head pose variation or a small head pose variation with respect to the RefPt. As an illustrative example, POSEVARth can be set to 0.014. In this example, at block 404, if Delta ($\Delta$) is greater than 0.014, the head pose variation is determined to be a large head pose variation. Accordingly, if at block 404, Delta ($\Delta$) is greater than POSEVARth (YES), the method 400 continues optionally to block 405, and to block 406 to determine a head pose based on a large head pose variation.

Referring again to block 404, if Delta ($\Delta$) is less than POSEVARth (NO), the method 400 continues to block 408 to determine a head pose based on a small head pose variation. Block 408 will be described in further detail herein with respect to FIGS. 3D, 3E and FIG. 5. In some embodiments, if Delta ($\Delta$) is equal to zero or a negative value, the method 400 can end (not shown) and return to tracking at block 212 of FIG. 2. This determination can be made at block 402 and/or at block 404. In this embodiment, Delta ($\Delta$) can indicate a head pose oriented in an upward direction, not a head pose oriented in a downward direction.

Referring again to large head pose variation, in one embodiment, the method 400 of FIG. 4 can include determining if a head pose of the vehicle occupant 106 is rotated at block 405. In other words, it is determined if the head 126 of the vehicle occupant 106 is turned (e.g., rotated/tilted) towards a left direction (e.g., a negative x-axis direction) or a right direction (e.g., a positive x-axis direction). When the head 126 of the vehicle occupant 106 is rotated, some facial features, for example, nose facial features, are not visible in images captured by the imaging device 116. Thus, the determination of a distance between nose facial feature points ($L_{ns}$) can be skewed. In one embodiment, the determination at block 405 is based on information from the imaging device 116 and/or based on information from other vehicle systems tracking facial feature points. For example, the determination at block 405 can be based on a head yaw of the vehicle occupant 106. In one embodiment, the head yaw is compared to predetermined thresholds at block 405. For example, if the head yaw is greater than −10 and the head yaw is less than 10, it is determined that the head pose is not rotated (NO) at block 405, and the method 400 can proceed to block 406 for determination and analysis of nose facial features. Otherwise, it is determined that the head pose is rotated (YES) at block 405, and the method 400 proceeds to block 412, which will be discussed in further detail herein.

In another embodiment, block 405 can include determining if the vehicle occupant 106 is attentive. Determining if the vehicle occupant 106 is attentive can be based on information from the imaging device 116 and/or information from other vehicle systems 118 tracking facial feature points. For example, it can be determined that the vehicle occupant 106 is not attentive if the head 126 of the vehicle occupant 106 is rotated, as discussed above. In this embodiment, if it is determined that the vehicle occupant 106 is not attentive at block 405, the method 400 can proceed to block 412. Otherwise, if it is determined that the vehicle occupant 106 is attentive at block 405, the method 400 can proceed to block 406 for determination and analysis of nose facial features.

At block 406, the method 400 includes determining a change in distance (e.g., magnitude) between one or more nose facial feature points (Lns) over the period of time T. More specifically, at block 410, the determination is calculated by comparing the $L_{ns}$ over the period of time T. The value of the $L_{ns}$ can be calculated as shown in equations (6) and (7) above. In particular, the value of the $L_{ns}$ as expressed in equation (7) can be calculated and tracked at different intervals over the time period T. Accordingly, the Euclidian vertical (i.e., y-axis component) distance between the two nose facial feature points $N_1$, $N_2$ is tracked over the time period T. In one embodiment, the distance between the two nose facial feature points $N_1$, $N_2$ at the end of time period T is compared to the initial distance between the two nose facial feature points $N_1$, $N_2$ (e.g., at the beginning of time period T). FIG. 3C is a schematic diagram illustrating an image 304', which shows a head pose in a large head pose variation as compared to the head pose shown in image 304 of FIG. 3B. Here, the facial features $F_1$, $F_2$, and $F_3$ are shown at positions at the end of the time period T. Additionally, an exploded view 306' illustrates the nose facial feature points $N_1$, $N_2$ in a large head pose variation. As shown in FIG. 3C, the change in distance between the nose facial feature points $N_1$, $N_2$ has increased in comparison to FIG. 3B.

Referring again to FIG. 4, if at block 410 the distance between the two nose facial feature points $N_1$, $N_2$ at the end of time period T is greater than the initial distance between the two nose facial feature points $N_1$, $N_2$ (YES), it is determined the that head pose is oriented in a downward direction at block 412. Said differently, upon determining the change in position (e.g., a change in distance) of the one or more nose facial feature points increases over the period of time T, determining the head pose further includes determining the head pose is oriented in a downward direction. In some embodiments, determining the change in position of the one or more nose facial feature points can based, in part, on the position of the imaging device 116. For example, if the imaging device 116 is positioned above the steering wheel 132 (e.g., see camera 130), determining the head pose is oriented in a downward direction can be based on determining the change in position of the one or more nose facial feature points decrease over the period of time T.

At block 412, a variable indicating a head down pose (e.g., stored at the memory 112 or disk 114) can be set to TRUE. Otherwise, if at block 410 the distance between the two nose facial feature points $N_1$, $N_2$ at the end of time period is less than or equal to the initial distance between the two nose facial feature points $N_1$, $N_2$ (NO), it is determined the that head pose is not oriented in a downward direction at block 414. Similar to block 412, at block 414 a variable indicating a head down pose (e.g., stored at the memory 112 or disk 114) can be set to FALSE. Once the head pose is determined at blocks 412 and/or 414, the method 400 can proceed back to the method 200 of FIG. 2.

In some embodiments, upon determining the head pose is a head down pose at block 412 (i.e., YES), the method 400 can optionally proceed to block 408 to determine a small head pose variation. For example, in some cases, a large head pose variation can be followed by small head pose variations. Block 408 will now be discussed in more detail.

ii. Determining Head Post Based on Small Head Post Variation

As discussed above with FIG. 4 at block 404, in some embodiments, determining the head pose based on a change in position of the head pose point (HPP) over time T can include identifying a large head pose variation or a small head pose variation based a difference (Delta (Δ)) between the HPP and a reference point (RefPt)). Thus, at block 408, the method 400 can include determining a small head pose variation. In one embodiment, determining a head pose based on a small head pose variation includes tracking a position of the head pose point (HPP) over a period of time T and determining whether the change in position over the period of time T has a periodic pattern. Said differently, it is determined if the HPP repeats a change in position over the period of time T. Further, in some embodiments, determining whether the change in position has a periodic pattern includes tracking the HPP over two time periods, for example, a first time period T and a second time period T. With respect to determining a small head pose variation, it is understood that the HPP that is calculated at block 208 of FIG. 2 can be defined by a position expressed in horizontal (i.e., x-axis component) and vertical (i.e., y-axis component) values.

A detailed explanation of determining a head pose based on a small head pose variation will now be discussed with an exemplary method 500 shown in FIG. 5. At block 502, the method 500 includes tracking the HPP for a period of time T. It is understood that block 502 can also be performed at block 212 of FIG. 2. In one embodiment, the HPP is tracked for a first time period T. At block 504, the method 500 includes comparing a displacement of the HPP over the time period T to a predetermined threshold. Said differently, a change in position of the HPP at different intervals over the time period T is determined and compared to a predetermined threshold. Thus, in one embodiment, the processor 110 can determine a difference and/or a displacement between positions of HPP at two time intervals for the time period T, for example, at the beginning of time T and at the end of time T. This can be expressed mathematically as:

$$HPP_\Delta = (HPP(ti) - HPP(ti-1)) \tag{9}$$

Alternatively, in embodiments including two time periods, a first time period T and a second time period T, the equation (9) can be expressed as:

$$HPP_{\Delta T1} = (HPP(t_{iT1}) - HPP(t_{iT1}-1)), \tag{10}$$

where T1 is equal to a first time period T.

Figure 5:
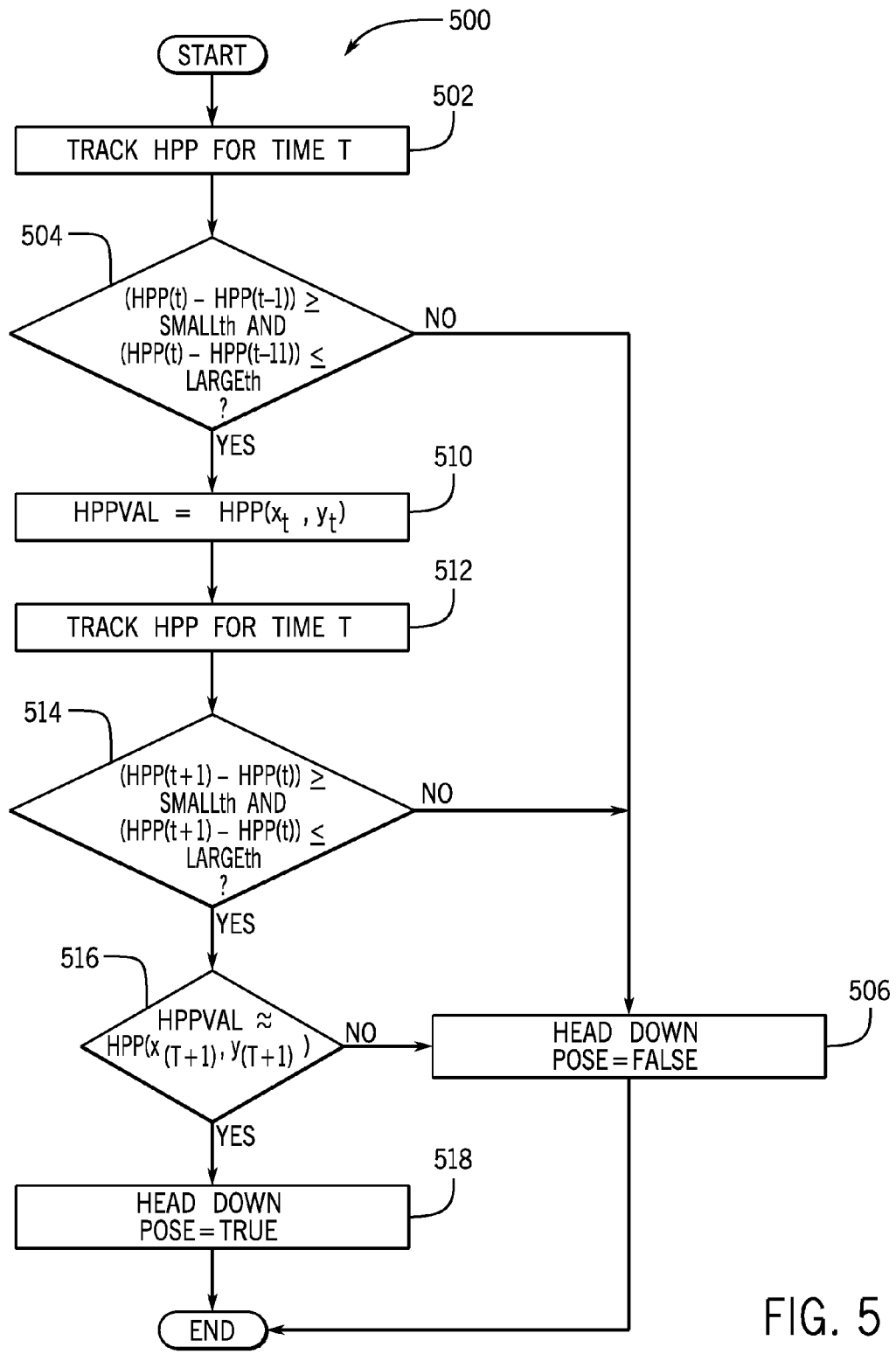
FIG. 5 is a flowchart diagram of another exemplary method for determining head pose for a small head pose variation according to an exemplary embodiment.

In some embodiments, and as shown in FIG. 5, the predetermined threshold can be a numerical range. Thus, at block 504, a displacement of the HPP over a period of time T is compared to two predetermined thresholds, SMALLth and LARGEth, to determine if the displacement falls within the two predetermined thresholds. In one illustrative embodiment, the numerical range is between 0.014 and 0.006.

Referring again to FIG. 5, at block 504, if the determination is (NO), the method 500 continues to block 506. At block 506, it is determined that the head pose is not oriented in a downward direction. Similar to block 414 of FIG. 4, a variable indicating a head down pose (e.g., stored at the memory 112 or disk 114) can be set to FALSE. The method 500 can then end and return to method 200 of FIG. 2.

Otherwise, if the determination at block 504 is YES, the method 500 continues to block 510 where the position (e.g., x,y coordinates) of HPP at the end of the time period T is stored (e.g., at the memory 112 or the disk 114) as variable HPPVAL. Thus, HPPVAL, according to equations (9) or (10) above, is set to the position of HPP at ($t_i$) as shown in the illustrative example of FIG. 3D or, in the alternative embodiment, the position of HPP at ($t_{iT1}$). It is understood that in some embodiments, the position of HPP can be a horizontal position value (e.g., x), a vertical position value (e.g., y), and/or both a horizontal position value and a vertical position value (e.g., x,y).

At block 512, similar to block 502, the method 500 can include tracking HPP for a time period T. In some embodiments, the processor 110 tracks the HPP for a second time period T. The second time period T can be equal to the same value as the first time period T (i.e., the time period T at block 502). At block 514, similar to block 504, the displacement of HPP over the period of time T is compared to a predetermine threshold. In this embodiment, the predetermined threshold is a numerical range. Thus, at block 514, a displacement of the HPP over a period of time T is compared to two predetermined thresholds, SMALLth and LARGEth, to determine if the displacement falls within the two predetermined thresholds. Accordingly, the processor 110 can determine a difference between positions of HPP at two time intervals for the time period T, for example, at the beginning of time T and at the end of time T. This can be expressed mathematically, similar to equation (9). Alternatively, in embodiments including two time periods, a first time period T and a second time period T, the displacement can be expressed mathematically as:

$$HPP_{\Delta T2} = (HPP(t_{iT2}) - HPP(t_{iT2}-1)), \tag{11}$$

where T2 is equal to a first time period T.

If the determination at block 514 is NO, the method 500 continues to block 506. Otherwise, if the determination at block 514 is YES, the method 500 continues to block 516. At block 516, it is determined if the change in position of HPP over the period of time T has a periodic pattern. Said differently, it is determined if the position of HPP at a first time interval is approximate to the position of HPP at a second time interval over the period of time T. More specifically, at block 516, it is determined if HPPVAL is approximately equal to the position (e.g., x, y coordinates) of HPP at the end of the time period T (i.e., HPP(t+1) or HPP ($t_{iT2}$)). If the determination at block 516 is NO, the method 500 continues to block 506. However, if the determination at block 516 is YES, the method 500 continues to block 518. At block 518 it is determined the head pose is oriented in a downward direction. A variable indicating a head down pose (e.g., stored at the memory 112 or disk 114) can be set to TRUE. Further, at block 518, the method 500 can end and return to the method 200 of FIG. 2.

Figure 3E:
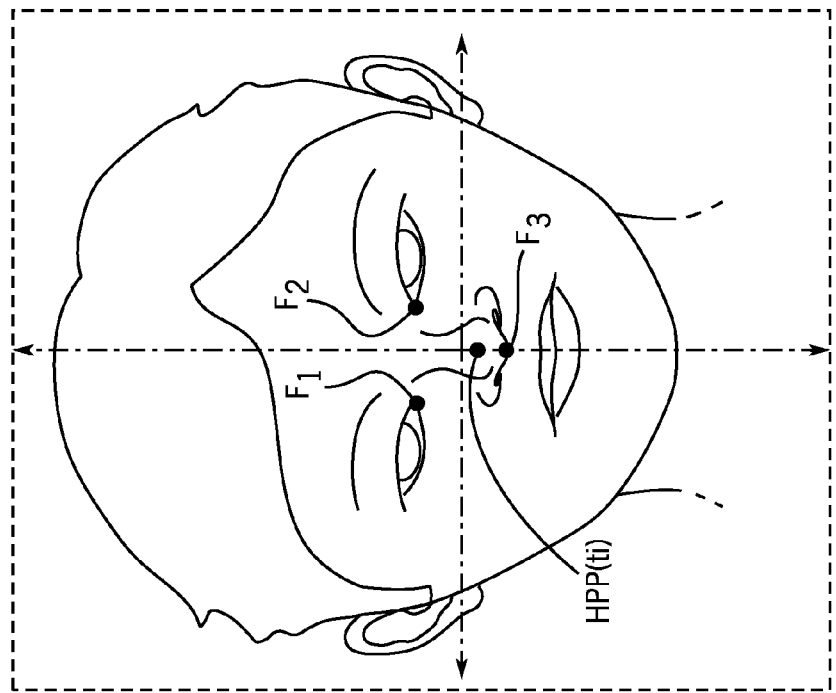
FIG. 3E is an illustrative image similar to the image shown in FIG. 3D showing a small head pose variation according to another exemplary embodiment.
Figure 3D:
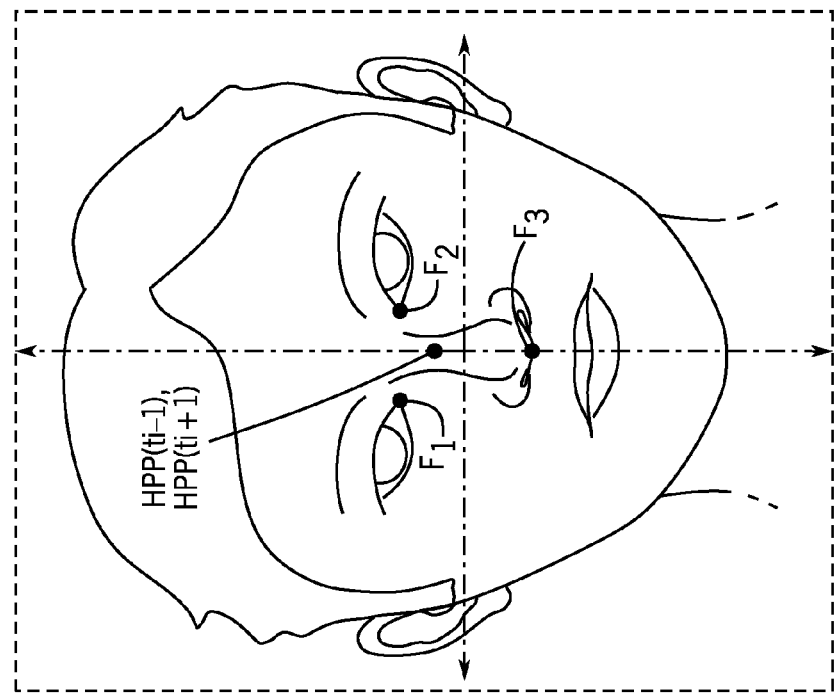
FIG. 3D is an illustrative image similar to the image shown in FIG. 3B showing a small head pose variation according to an exemplary embodiment.

An illustrative example for determining a head pose based on a small head pose variation will now be discussed with reference to FIGS. 3D and 3E. FIG. 3D illustrates an image 308 similar to image 304 of FIG. 3B. FIG. 3E illustrates an image 308' showing a small pose variation from the image 308. In FIG. 3D, HPP(ti-1) is shown as an initial HPP. As the HPP is tracked over a time period T, a small variation in head pose is shown in FIG. 3E at HPP(ti) and a small variation in head pose is shown again in FIG. 3D at HPP(ti+1). Accordingly, as the position of the HPP is tracked over the period of time T as shown in FIGS. 3D and 3E, the position of HPP exhibits a periodic pattern from HPP(ti-1), HPP(ti), and HPP(ti+1), where HPP(ti-1) is approximate to HPP(ti+1).

iii. Updating Reference Point(RefPt)

As mentioned above, the reference point (RefPt) and the period of time T with respect to the head pose point (HPP) can be updated. More specifically, the RefPt can be dynamically learned and updated continuously in real-time based on the HPP. In some embodiments, the RefPt is a learned variant of the HPP. As described herein, the RefPt and the period of time T are continuously updated during tracking based on tracking data (e.g., the HPP, vehicle data). In other embodiments, the RefPt can be dynamically learned and updated continuously in real-time based on vehicle data. It is understood that other learning techniques, for example, machine learning algorithms, artificial intelligence, neural networks, among others, could also be used. The learning techniques can be based on any combination of data including tracking data, HPP data, and/or vehicle data. Accordingly, referring again to FIG. 2, at block 218 the method 200 can include updating the reference point (RefPt). In one embodiment, the update can be based on a displacement variance and a displacement mean of the HPP over a period of time T. The update can be contingent on certain vehicle and/or vehicle occupant conditions to ensure the RefPt is correctly updated.

Figure 6:
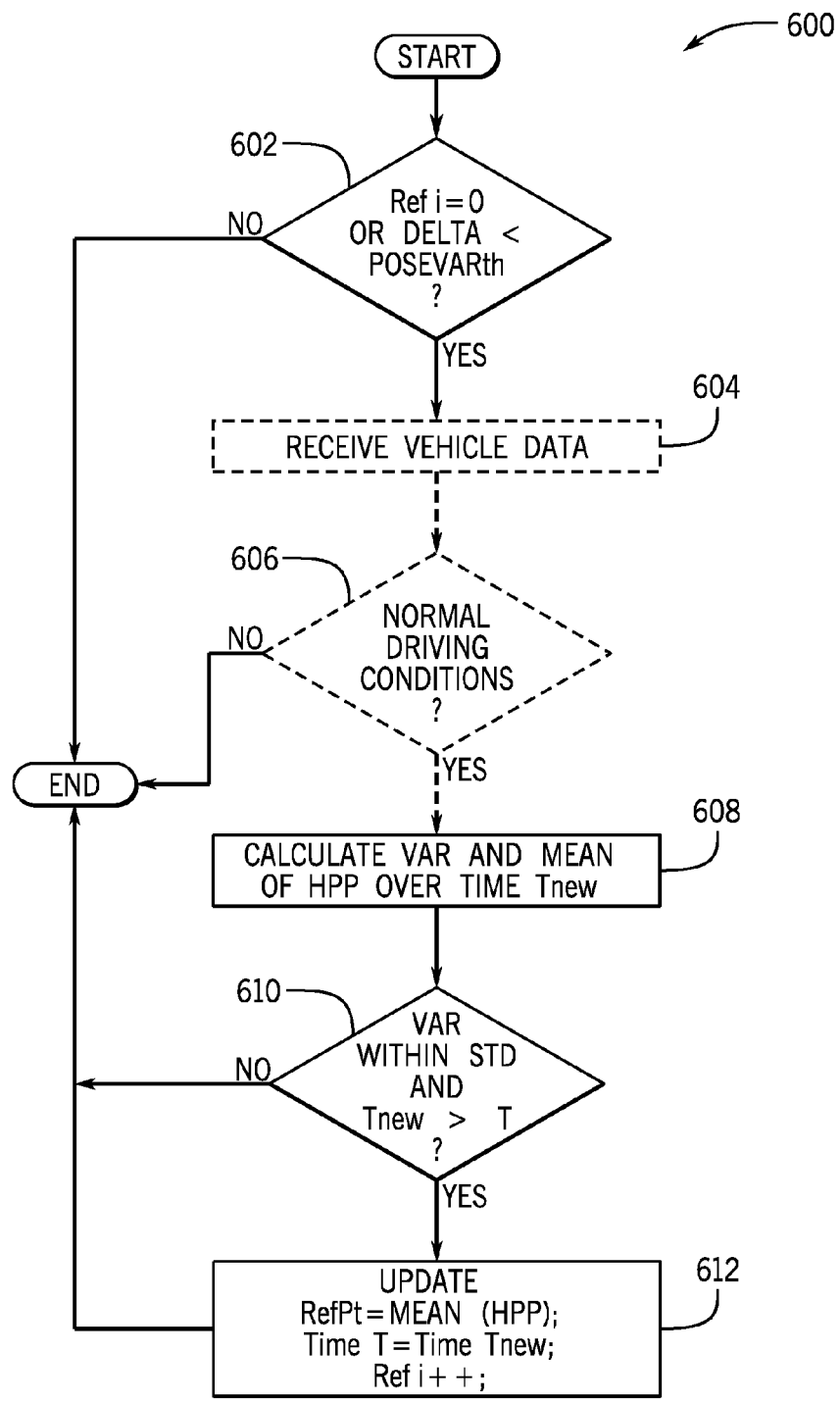
FIG. 6 is a flowchart diagram of an exemplary method for updating a reference point based on a head pose point over a period of time according to an exemplary embodiment.

Referring now to FIG. 6, an exemplary method 600 is shown for updating the RefPt is shown. It is understood that method 600 can run in parallel with the other methods described herein. For example, in some embodiments, method 600 can be triggered after determining the HPP at block 208 of FIG. 2. In other embodiments, method 600 can be periodically triggered during tracking at block 212. Other embodiments can also be implemented. Method 600 includes at block 602, determining if the reference point update counter (Ref_i) is equal to zero (0) or Delta (Δ) (i.e., determined at block 402 of FIG. 4) is less than POSEVARth. In other words, in one embodiment, the update only occurs if the RefPt has not been updated previously or a small pose head variation is detected (e.g., similar to block 404 of FIG. 4).

If the determination at block 602 is NO, the method 600 ends and can return to method 200 of FIG. 2. In one embodiment, if the determination at block 602 is YES, the method 600 can optionally proceed to block 604. At block 604, the method 600 includes receiving vehicle data from, for example, the vehicle systems 118 of FIG. 1. At block 606, it is determined whether normal driving conditions exist based on the vehicle data received at block 604. If the determination at block 606 is NO, the method 600 ends and can return to method 200 of FIG. 2. Otherwise, if the determination at block 606 is YES, the method 600 can proceed to calculate the RefPt at block 608.

In some embodiments, normal driving conditions include driving in a straight direction at an average speed (e.g., no turns, sudden maneuvers, stop and go). In other embodiments, normal driving conditions include conditions where probability of vehicle occupant distraction is low (e.g., vehicle is not at rest, vehicle speed is higher than 30 kmph (10 mph)). In further embodiments, normal driving conditions exclude any conditions that can skew feature point extraction and/or skew a normalized baseline of a head pose in a neutral orientation or in a downward direction.

Illustrative examples of vehicle data and normal driving conditions will now be discussed. It is understood that block 606 can include threshold comparisons specific to different types of vehicle systems and/or vehicle data. Threshold data for normal driving conditions for each type of vehicle system and or vehicle data can be stored at the memory 112 and/or the disk 114 of FIG. 1. In one embodiment, the vehicle system 118 is a power steering system. In this illustrative example, at block 606, it is determined if the steering angle (e.g., vehicle data) from the power steering system is greater than a predetermined angle (e.g., 20 degrees) thereby indicating the vehicle is in a turn maneuver. If the vehicle is in a turn maneuver, a normal driving condition does not exist and the RefPt is not updated (e.g., the method 600 ends).

As another example, the vehicle system 118 is an electronic stability control system. In this illustrative example, at block 606, it is determined if the vehicle yaw (e.g., vehicle data) from the electronic stability control system is greater than a predetermined angle (e.g., 3 degrees) thereby indicating the vehicle is in a sudden turn or maneuver. If the vehicle is in a sudden turn or maneuver, a normal driving condition does not exist and the RefPt is not updated (e.g., the method 600 ends).

In a further example, the vehicle system 118 is an antilock brake system. In this illustrative example, at block 606, it is determined if the vehicle speed (e.g., vehicle data) from a vehicle speed sensor of the anti-lock brake system is less than a predetermined speed (e.g., 30 kmph (10 mph)) thereby indicating the vehicle is stopped or in a stop and go situation. In these situations, probability of the vehicle occupant 106 not paying attention to the road can be high. Accordingly, a normal driving condition does not exist and the RefPt is not updated (e.g., the method 600 ends).

In another example, the vehicle system 118 is the imaging device 116 and/or a tracking system. In this illustrative example, at block 606, it is determined if a yaw of a head pose indicates the head pose is oriented in a right or left direction, for example, if the head yaw is greater than a predetermined angle (e.g., 25 degrees) in the right or left direction. A head pose in a left or right direction can skew a normalized baseline of a head pose in a neutral orientation or in a downward direction. Accordingly, a normal driving condition does not exist and the RefPt is not updated (e.g., the method 600 ends).

In a further example, the vehicle system 118 is a head down warning (e.g., light warning system). In this illustrative example, at block 606, it is determined if the head down warning is ON. In this example, if the head pose is determined to be oriented in downward direction, a normal driving condition does not exist and the RefPt is not updated (e.g., the method 600 ends). In an alternate embodiment, the variable indicating a head pose oriented in a downward direction can be checked at block 606 to determine if the head pose is oriented in downward direction.

As mentioned above, if at block 606, it is determined that a normal driving condition exists, the method 600 continues to block 608. Here, the mean and variance of the HPP over a time period T is determined. More specifically, the mean and variance of the HPP over a second time period T (e.g., a time $T_{new}$) that is different than the time period T (e.g., the current time period T). The mean is determined as the mean of the displacement of HPP over the second time period. This can be expressed mathematically as:

$$\overline{HPP} = \frac{\sum (HPP_{Tnewi} - HPP_{Tnewi-1})}{i} \quad (12)$$

Further, the variance (VAR) of the displacement of HPP over the second time period can be expressed mathematically as:

$$VAR = \frac{\sum (HPP_{Tnewi} - \overline{HPP})^2}{i-1} \quad (13)$$

At block 610, it is determined if the variance (VAR) is within a predetermined standard deviation (STD) and the second time period is greater than the time period T. If the determination at block 610 is YES, the method 600 continues to block 612 where RefPt and the time period T are updated. Specifically, the RefPt is set to the mean of HPP and the time period T is set to the second time period Tnew. Additionally, the counter Ref_i is incremented indicating that the variable RefPt has been set and/or updated. Thereafter, the method 600 can end and/or return to method 200 of FIG. 2 for further tracking. Similarly, if the determination at block 610 is NO, the method 600 can end and/or return to method 200 of FIG. 2 for further tracking.

iv. Verifying Head Pose

Figure 7:
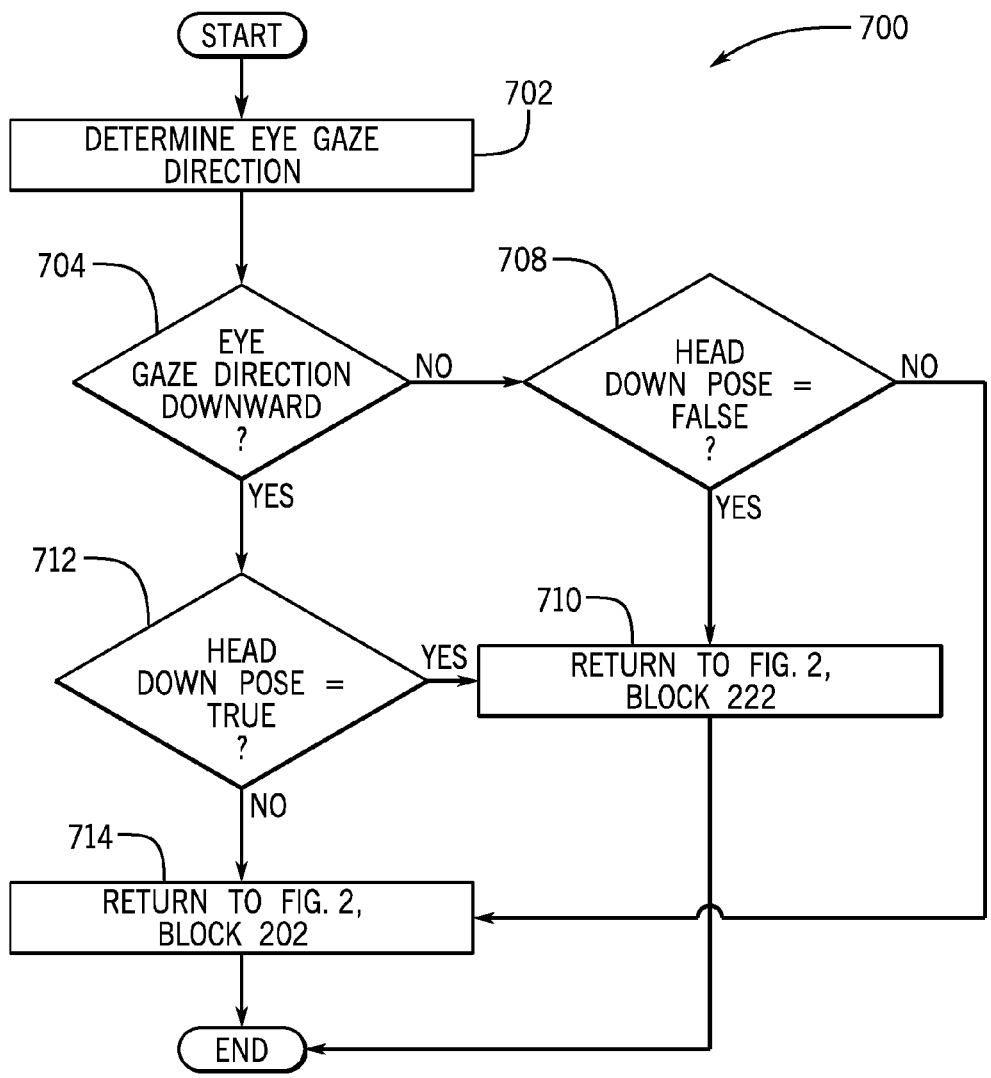
FIG. 7 is a flowchart diagram of an exemplary method for verifying head pose based on eye gaze according to an exemplary embodiment.

The embodiments discussed herein determine if a head pose is oriented in a downward direction based on facial feature points without considering eye gaze. However, as shown in FIG. 2 at block 220, in some embodiments, eye gaze can be used to verify the determined head pose. Referring now to FIG. 7, a method 700 is shown for verifying the head pose determined at block 216 of FIG. 2 with eye gaze. At block 702, the method 700 includes determining an eye gaze direction of the vehicle occupant 106. In one embodiment, the imaging device 116 determines and tracks the eye gaze of the vehicle occupant 106. In this embodiment, the eye gaze direction is determined in a vertical position with a y-axis component. Accordingly, eye gaze can be determined to be oriented (e.g., directed) upward in a positive y-axis direction or eye gaze can be determined to be oriented (e.g., directed) downward in a negative y-axis direction. At block 704, it is determined if the eye gaze direction is oriented in a downward direction. If the determination at block 704 is NO (e.g., eye gaze direction is oriented in an upward direction), the head pose determined at block 216 of FIG. 2 is verified. Specifically, it is determined if the eye gaze direction matches the determined head pose. Thus, at block 708, it is determined if the head pose is not a head down pose (e.g., head down pose =FALSE). If the determination at block 708 is YES, the head pose is verified as being correct (e.g., not downward) and the method 700 continues to block 710 where processing continues to method 200 of FIG. 2, to control one or more vehicle systems at block 222. Otherwise, if the determination at block 708 is NO, the method 700 ends and/or processing returns to method 200 of FIG. 2. Specifically, the method for determining head pose can be reset at block 202 of FIG. 2.

Referring again to FIG. 7 block 704, if the determination is YES (e.g., eye gaze direction is oriented in an upward direction), the method 700 continues to verify the head pose determined at block 216 of FIG. 2. Specifically, it is determined if the eye gaze direction matches the determined head pose. Thus, at block 712, it is determined if the head pose is a head down pose (e.g., head down pose=TRUE). If the determination at block 712 is NO, the method 700 ends and/or processing returns to method 200 of FIG. 2. Specifically, the method for determining head pose can be reset at block 202 of FIG. 2. Otherwise, if the determination at block 712 is YES, method 700 continues to block 710 where processing continues to method 200 of FIG. 2, to control one or more vehicle systems at block 222.

D. Controlling Vehicle Systems

Referring again to FIG. 2, upon determining the head pose at block 216, the method 200 continues to block 222 where the method 200 includes controlling one or more vehicle systems 118 of the vehicle 102 based on the head pose. In some embodiments, the one or more vehicle systems 118 of the vehicle 102 are controlled only upon determining the head pose is oriented in a downward direction and/or the head pose is a head down pose. In other embodiments, the one or more vehicle systems 118 of the vehicle 102 are controlled based on the level of variation in the head pose oriented in a downward direction (e.g., a large downward variation, a very large downward variation, and extremely large variation). Different vehicle systems 118 and parameters of vehicle systems 118 can be controlled. Several illustrative examples will now be discussed with control of specific vehicle systems that may not be shown in FIG. 1A or FIG. 1B.

According to a first illustrative example, visual, audible, and/or tactile feedback can be controlled based on the head pose. For example, if the head pose is determined to be oriented in a downward direction, the processor 110 can control the vehicle seat 108 to vibrate or shake. In another example, the steering wheel 132 can be controlled to shake or vibrate. In some cases, one or more lights and/or visual indicators could be activated in response to determining the head pose is oriented in a downward direction. Further, an audible sound, for example, activation of an infotainment system can be activated.

As another illustrative example, an automatic cruise control system can be changed to increase or decrease a headway distance based on the head pose. For example, if the head pose is determined to be oriented in a downward direction, the automatic cruise control system can increase the headway distance to a second headway distance. As another illustrative example, a blind spot indicator system can be controlled based on the head pose. For example, the blind spot indicator system detection area can be modified based on the head pose. In other cases, the blind spot indicator system can be modified to deliver warnings earlier if the head pose is determined to be oriented in a downward direction.

It is understood that the illustrative examples discussed above are exemplary in nature and other types of control and vehicle systems can be implemented. Further examples of controlling vehicle systems and vehicle system parameters can also be found in U.S. Pub. No. 2016/0001781, filed Sep. 11, 2015, the entirety of which is hereby incorporated by reference.

The embodiments discussed herein can also be described and implemented in the context of non-transitory computer-readable storage medium storing computer-executable instructions. Non-transitory computer-readable storage media includes computer storage media and communication media. For example, flash memory drives, digital versatile discs (DVDs), compact discs (CDs), floppy disks, and tape cassettes. Non-transitory computer-readable storage media can include volatile and nonvolatile, removable and non-removable media implemented in any method or technology for storage of information such as computer readable instructions, data structures, modules or other data. Non-transitory computer readable storage media excludes transitory and propagated data signals.

It will be appreciated that various embodiments of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A computer-implemented method for detecting a head pose in a vehicle, comprising:
   receiving images of a vehicle occupant located in the vehicle from an imaging device;
   selecting facial feature points from a plurality of facial feature points extracted from the images;
   calculating a head pose point by averaging vertical position components of the selected facial feature points;
   determining the head pose based on a change in position of the head pose point over a period of time T, wherein determining the head pose further includes calculating a difference between the head pose point and a reference point, the reference point being a value indicating a position on a plane of the image and being a learned variant of the head pose point; and
   controlling one or more vehicle systems of the vehicle based on the head pose.

2. The computer-implemented method of claim 1, wherein selecting the facial feature points includes selecting fixed facial feature points from the plurality of facial feature points, the fixed facial feature points having positions unaffected by movement of other facial feature points.

3. The computer-implemented method of claim 1, wherein calculating the head pose point by normalizing the selected facial feature points further includes averaging positions of the selected facial feature points.

4. The computer-implemented method of claim 3, wherein calculating the head pose point by normalizing the selected facial feature points further includes weighting the selected facial feature points based on a confidence level assigned to each of the selected facial feature points.

5. The computer-implemented method of claim 4, further including determining a change in position of one or more nose facial feature points over the period of time T.

6. The computer-implemented method of claim 5, wherein upon determining the change in position of the one or more nose facial feature points increases over the period of time T, determining the head pose further includes determining the head pose is oriented in a downward direction.

7. The computer-implemented method of claim 1, further including updating the reference point based on a variance of the head pose point over a second period of time T.

8. The computer-implemented method of claim 7, where upon determining the variance of the head pose point is within a predetermined standard deviation, the method includes updating the reference point to the mean of the head pose point over the second period of time T.

9. The computer-implemented method of claim 1, wherein upon determining a change in position of the head pose point over the period of time T has a periodic pattern, determining the head pose further includes determining the head pose is oriented in a downward direction.

10. The computer-implemented method of claim 1, further comprising:
comparing the difference between the head pose point and the reference point to a pose variation threshold;
when the difference is determined to be greater than the pose variation threshold, determining a change in a distance between two nose facial feature points over the period of time T, and upon determining the change in the distance increases, determining the head pose is oriented in a downward direction;
when the difference is determined to be not greater than the pose variation threshold, tracking the head pose point for at least two consecutive time periods, the at least two consecutive time periods equal to the period of time T, and determining a movement pattern from a first position to a second position for each of the at least two consecutive time periods, and upon determining the movement pattern of each of the at least two consecutive time periods are approximately the same, determining the head pose is oriented in a downward direction.

11. A system for detecting a head pose in a vehicle, comprising:
an imaging device operably connected for computer communication with the vehicle, the imaging device capturing images of a face of a vehicle occupant located in the vehicle;
a processor operably connected for computer communication with the imaging device and the vehicle, the processor extracts a plurality of facial feature points from the images and selects facial feature points from the plurality of facial feature points, wherein each of the selected facial feature points have a position on a plane of the images, wherein the processor calculates a head pose point by normalizing vertical components of the positions of the selected facial feature points, and determines the head pose based on a change in position of the head pose point over a period of time T, wherein the processor calculates the change in position of the head pose point as a change in position between the head pose point and a reference point over the period of time T, the reference point being a value indicating a position on a plane of the image and being a learned value based on a mean value of the head pose point over time; and
one or more vehicle systems operably connected for computer communication to the processor and the vehicle, wherein the processor controls the one or more vehicle systems based on the head pose.

12. The system of claim 11, wherein the selected facial feature points maintain a stable position when exposed to movement from facial expressions.

13. The system of claim 11, wherein the processor calculates the head pose point as a vertical normalization of the positions of the selected facial feature points by averaging the positions of the selected facial feature points.

14. The system of claim 11, wherein the processor updates the reference point based on a variance and a mean of the head pose point over the period of time T.

15. The system of claim 11, wherein the processor determines a change in a distance between two nose facial feature points over the period of time T.

16. The system of claim 15, wherein upon determining the change in the distance between the two nose facial feature points increases over the period of time T, the processor determines the head pose is oriented in a downward direction.

17. The system of claim 11, wherein the imaging device tracks the head pose point for at least two consecutive time periods, the at least two consecutive time periods equal to the period of time T, and the processor determines a movement pattern from a first position to a second position for each of the at least two consecutive time periods.

18. The system of claim 17, wherein upon determining the movement pattern of each of the at least two consecutive time periods are approximately the same, the processor determines the head pose is oriented in a downward direction.

19. The system of claim 11, wherein the imaging device tracks an eye gaze of the vehicle occupant.

20. The system of claim 19, wherein determining the head pose further includes the processor verifying the eye gaze is oriented in a direction of the head pose.

21. A non-transitory computer-readable medium for detecting a head pose in a vehicle including instructions stored thereon, that when executed by a processor perform a method, the method comprising:
receiving images of a vehicle occupant located in the vehicle from an imaging device;
calculating a head pose point by averaging vertical position components of facial feature points selectively identified from the images;
determining the head pose based on a change in position of the head pose point over a period of time T, wherein determining the head pose further includes calculating a difference between the head pose point and a reference point, the reference point being a value indicating a position on a plane of the image and being a learned variant of the head pose point; and
controlling a function of one or more vehicle systems of the vehicle based on the head pose.

22. The non-transitory computer-readable medium of claim 21, wherein the facial feature points are selectively identified based on whether the facial feature points maintain a stable position when the facial feature points are exposed to movement of other facial feature points.

23. The non-transitory computer-readable medium of claim 21, further including upon determining the difference between the head pose point and the reference point meets a head down threshold, determining a change in displacement between one or more nose facial feature points over the period of time T.

24. The non-transitory computer-readable medium of claim 23, wherein upon determining the change in displacement between the one or more nose facial feature points increases over the period of time T, determining the head pose includes determining the head pose is oriented in a downward direction.

* * * * *